Nov. 18, 1930.          F. RÖDLER          1,782,179
CENTRIFUGAL EXTRACTOR
Filed Nov. 2, 1927

INVENTOR.
Fred Rödler
BY
Allen & Allen
ATTORNEY.

Patented Nov. 18, 1930

1,782,179

UNITED STATES PATENT OFFICE

FRED RODLER, OF CINCINNATI, OHIO

CENTRIFUGAL EXTRACTOR

Application filed November 2, 1927. Serial No. 230,609.

My invention relates to centrifugal extractors, and particularly to laboratory apparatus for extracting and determining the percentage of the soluble constituents of road material.

In the art, centrifugal machines for extracting the soluble constituents of matter to be tested are old and well known, and the principle of operation of my device is not new. As an example of the general arrangement of parts and the mechanical principle involved, reference is hereby made to Patent #1,105,954. In such apparatus there is a rotatable bowl into which the material to be tested is poured. A filter paper of annular shape is disposed on the top wall of the bowl, and a cover or lid is clamped down on the filter paper. The filtrate is thrown through the filter paper lengthwise of the fiber between the bowl and cover. An outer receptacle encloses the rotatable bowl and the filtrate striking the inner walls of the receptacle runs down to the bottom, from which it discharges into a vessel. It is customary in determining the percentage of soluble constituents in material being tested to weigh the material put in the extracting bowl both before and after the centrifuging operation, the difference in weight representing the volatile matter present.

It is the object of my invention to provide improvements in the bowl support which will make variations in weight, due to the solvent seeping into the working parts of the apparatus, more unlikely. It is further my object to so construct the bottom of the bowl that the filtrate will drain away more readily than in existing apparatus.

The above and other improvements to which reference will be made during the ensuing disclosure I accomplish by that certain combination and arrangement of parts of which I have shown a preferred embodiment.

In the drawings:—

Figure 1:
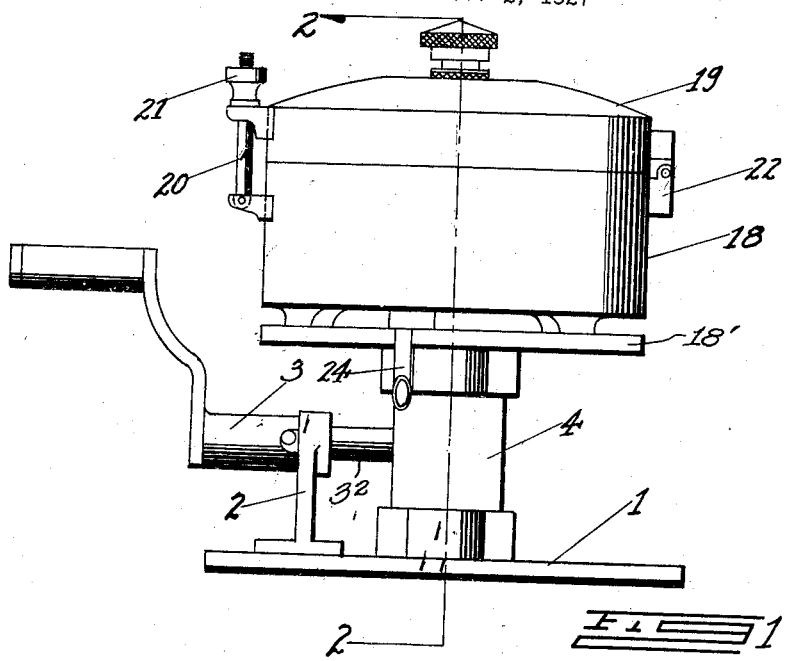
Figure 1 is a side elevation of the centrifugal apparatus.
Figure 2:
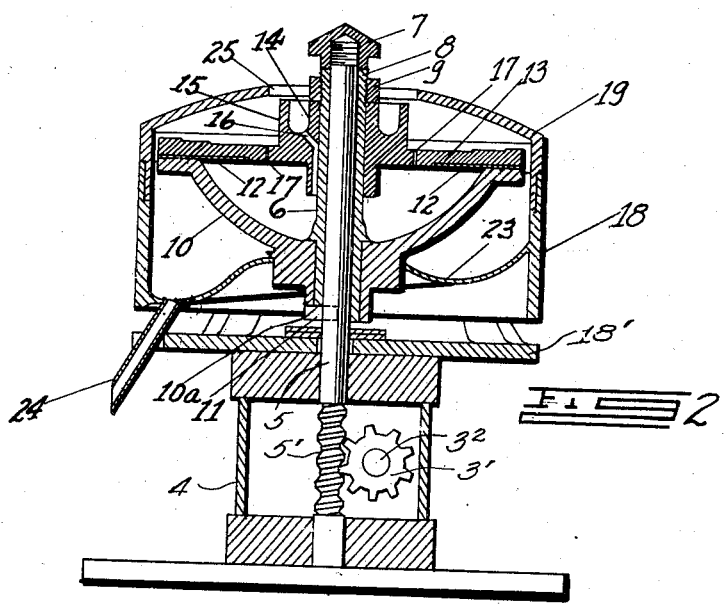
Figure 2 is a sectional view of the bowl taken along the lines indicated at 2—2 in Figure 1, the gearing being shown in full lines.

On a suitable base 1 I have shown a bracket 2 within which is journaled a handle 3 with which the apparatus is turned. Within the casing 4 I have provided a worm 5' on the shaft 5 and a worm gear 3' mounted on a shaft $3^2$ connected with the handle 3 by which rotary movement is imparted to the shaft 5. On the shaft 5 I have mounted a sleeve 6 and the said sleeve is held down on a pin 11 in the shaft by the nut 7. The upper end of the sleeve is externally threaded as indicated at 8 with an adjustment nut 9 engaging the threads 8. The bowl 10 is pressed on the lower end of the sleeve 6 which causes them to rotate as a single unit. The lower end of the sleeve has a slot $10^a$ which engages the pin 11 extending from the shaft 5 which prevents the sleeve and bowl from sliding down beyond a fixed point. This makes it possible to remove the bowl and sleeve assembly in order to weigh it.

An annular filter paper 12 is disposed on the top wall of the bowl and the cover member 13 may be tightened down, clamping the filter paper against the top wall of the bowl by means of the nut 9. On the upper end of the cover 13 I have provided an annular groove 14 in an enlarged hub-like portion 15. A hole 16 or a series of holes is the passage for admitting liquids from the grooved portion to the interior of the bowl. The cover is also provided with a series of small holes 17 which allow the air to escape from the bowl when the solvent is poured into it.

Surrounding the bowl and cover is a casing 18 having a lid 19 which fits over it and which is clamped down by a bolt 20 and thumb nut 21. The casing 18 is stationary and rigidly connected to and mounted upon a platform 18' supported on the gear casing 4. The particular assembly illustrated also has a hinge 22 which secures the casing cover to the casing. The bottom of the casing has a rounded groove 23 sloping in such a way that any filtrate which is ejected from the bowl 10 into the casing will flow out through a pipe 24. The provision of a casing with a sloping bottom and an outlet at a low point is an improvement over existing structures with flat bottoms as in this type it is necessary to tip the entire apparatus to cause the filtrate to drain out.

The operation of the apparatus is as follows: The material to be tested is placed in the bowl and a filter paper disposed on the top wall. The cover is then inserted and tightened down by means of the nut 9. The solvent is then poured into the grooved portion 14. The center of the casing cover is open as indicated at 25 so that the solvent may be poured directly into the groove 14. The solvent drains down into the bowl, and it should be particularly noted that during the discharge of the solvent into the bowl it is not exposed to any threaded connections which are a source of error in calculating percentages of extrated material.

The operator then turns the handle 3 and the bowl is rapidly rotated, causing the solvent to be projected centrifugally through the filter paper. The filtrate is flung against the inner walls of the casing and drains down into the bottom of the casing, from which it drains through the pipe 24.

Having thus described my invention, what I claim as new and desire to secure by Letters Patent, is:—

1. A centrifugal extractor comprising a rotatable shaft, a bowl, a cover for said bowl, means for clamping said cover on said bowl, a casing surrounding said bowl having a lid, a sleeve detachably mounted on said shaft, said sleeve and shaft extending through said bowl cover, said bowl attached to and rotatable with said sleeve, said bowl cover having an extended hub having an annular groove therein with a passage extending from said groove to within said bowl for directing the flow of fluid to the outer periphery of said sleeve.

2. A centrifugal extractor comprising a rotatable shaft, a bowl, a cover for said bowl, means for clamping said cover on said bowl, a casing surrounding said bowl having a lid, a sleeve detachably mounted on said shaft, said sleeve and shaft extending through said bowl cover, said bowl attached to and rotatable with said sleeve, said bowl cover having an extended hub having an annular groove therein with a passage extending from said groove to within said bowl for directing the flow of fluid to the outer periphery of said sleeve, and an air vent in said cover.

3. A centrifugal extractor comprising a rotatable shaft, a bowl, a cover for said bowl, means for clamping said cover on said bowl, a casing surrounding said bowl having a lid, a sleeve detachably mounted on said shaft, said sleeve and shaft extending through said bowl cover, said bowl attached to and rotatable with said sleeve, said bowl cover having an extended hub having an annular groove therein with a passage extending from said groove to within said bowl for directing the flow of fluid to the outer periphery of said sleeve, and said lid having an opening directly over the annular groove in said cover.

4. A centrifugal extractor comprising a rotatable shaft, a bowl, a cover for said bowl, means for clamping said cover on said bowl, a casing surrounding said bowl having a lid, a sleeve detachably mounted on said shaft, said sleve and shaft extending through said bowl cover, said bowl attached to and rotatable with said sleeve, said bowl cover having an extended hub having an annular groove therein with a passage extending from said groove to within said bowl for directing the flow of fluid to the outer periphery of said sleeve, and an air vent in said cover, and said lid having an annular opening directly over the groove in said cover.

5. A centrifugal extractor comprising a rotatable shaft, a bowl, a cover for said bowl, means for clamping said cover on said bowl, a casing surrounding said bowl having a lid, a sleeve detachably mounted on said shaft, said sleeve and shaft extending through said bowl cover, said bowl attached to and rotatable with said sleeve, said bowl cover having an extended hub having an annular groove therein with a passage extending from said groove to within said bowl for directing the flow of fluid to the outer periphery of said sleeve, said means for clamping said cover on said bowl comprising a nut threaded on said shaft.

6. A centrifugal extractor comprising a rotatable shaft, a bowl, a cover for said bowl, a casing surrounding said bowl, a lid on said casing, a sleeve detachably mounted on said shaft, said shaft and sleeve projecting through the cover for said bowl, means on said sleeve for securing said cover to said bowl, said bowl attached to and rotatable with said sleeve, said bowl cover having an extended hub having an annular groove therein with a passage extending to said groove to within said bowl for directing the flow of fluid to the outer periphery of said sleeve.

7. A centrifugal extractor comprising a rotatable shaft, a bowl, a cover for said bowl, a casing surrounding said bowl, a lid on said casing, a sleeve detachably mounted on said shaft, said shaft and sleeve projecting through the cover for said bowl, means on said sleeve for securing said cover to said bowl, said bowl attached to and rotatable with said sleeve, said bowl cover having an extended hub having an annular groove therein with a passage extending to said groove to within said bowl for directing the flow of fluid to the outer periphery of said sleeve, and an aperture in the casing lid above the annular groove in the hub.

FRED RODLER.